United States Patent
Christensen et al.

(10) Patent No.: US 10,741,894 B2
(45) Date of Patent: Aug. 11, 2020

(54) METAL/AIR BATTERY WITH GAS SEPARATIONS UNIT AND LOAD-LEVELING OXYGEN STORAGE SYSTEM

(71) Applicants: Robert Bosch GmbH, Stuttgart (DE); John F. Christensen, Elk Grove, CA (US); Aleksandar Kojic, Sunnyvale, CA (US); Boris Kozinsky, Waban, MA (US)

(72) Inventors: John F. Christensen, Elk Grove, CA (US); Aleksandar Kojic, Sunnyvale, CA (US); Boris Kozinsky, Waban, MA (US)

(73) Assignee: Robert Bosch GmbH, Stuttgart (DE)

( * ) Notice: Subject to any disclaimer, the term of this patent is extended or adjusted under 35 U.S.C. 154(b) by 275 days.

(21) Appl. No.: 15/536,102

(22) PCT Filed: Dec. 18, 2015

(86) PCT No.: PCT/US2015/066842
§ 371 (c)(1),
(2) Date: Jun. 14, 2017

(87) PCT Pub. No.: WO2016/100900
PCT Pub. Date: Jun. 23, 2016

(65) Prior Publication Data
US 2017/0365899 A1     Dec. 21, 2017

Related U.S. Application Data (60) Provisional application No. 62/093,756, filed on Dec. 18, 2014.

(51) Int. Cl.
*H01M 12/08* (2006.01)
*H01M 8/0662* (2016.01)
*H01M 8/04089* (2016.01)

(52) U.S. Cl.
CPC ....... *H01M 12/08* (2013.01); *H01M 8/04089* (2013.01); *H01M 8/0681* (2013.01);
(Continued)

(58) Field of Classification Search
CPC ........... H01M 8/0681; H01M 8/04089; H01M 2220/20; H01M 12/08; H01M 2250/20; Y02T 90/32; Y02E 60/128
(Continued)

(56) References Cited

U.S. PATENT DOCUMENTS

2006/0159966 A1   7/2006   Wake et al.
2006/0243503 A1   11/2006  Carlson
(Continued)

FOREIGN PATENT DOCUMENTS

EP         2775560 A1       9/2014
WO      WO 99/60654    *   11/1999   ............ H01M 12/08

OTHER PUBLICATIONS

Extended European Search Report for European Application No. 15871222.4, dated May 28, 2018 (8 pages).
(Continued)

*Primary Examiner* — Jonathan G Jelsma
*Assistant Examiner* — Omar M Kekia
(74) *Attorney, Agent, or Firm* — Maginot, Moore & Beck LLP (57) ABSTRACT

A metal/air battery includes an oxygen management system that delivers oxygen to the battery during a discharge cycle. The oxygen management system includes an oxygen separations unit and an oxygenated gas supply reservoir that are fluidly coupled to a positive electrode of the battery via a valve system. The valve system selectively places the oxygen separations unit and the oxygenated gas supply reservoir in fluid communication with the positive electrode during the discharge cycle. The oxygen management system also
(Continued)

includes a compressor with an outlet fluidly coupled to the oxygenated gas supply reservoir and an inlet fluidly connected to the oxygen separations unit via the valve system. The valve system selectively places the oxygen separations unit in fluid communication with the oxygenated gas supply reservoir during one or more of the discharge cycle and a charge cycle of the battery.

20 Claims, 3 Drawing Sheets

(52) U.S. Cl.
CPC .... *H01M 2220/20* (2013.01); *H01M 2250/20* (2013.01); *Y02E 60/128* (2013.01); *Y02T 90/32* (2013.01)

(58) Field of Classification Search
USPC .......................................................... 429/403
See application file for complete search history.

(56) References Cited

U.S. PATENT DOCUMENTS

| 2011/0143226 A1 | 6/2011 | Pulskamp et al. |
| 2012/0040253 A1 | 2/2012 | Hermann |
| 2014/0255802 A1* | 9/2014 | Barde ............... H01M 10/0567 429/405 |
| 2014/0272611 A1 | 9/2014 | Albertus et al. |

OTHER PUBLICATIONS

International Search Report corresponding to PCT Application No. PCT/US2015/066842, dated Apr. 15, 2016 (3 pages).

* cited by examiner

METAL/AIR BATTERY WITH GAS SEPARATIONS UNIT AND LOAD-LEVELING OXYGEN STORAGE SYSTEM

This application is a 35 U.S.C. § 371 National Stage Application of PCT/US2015/066842, filed on Dec. 18, 2015, which claims the benefit of priority to U.S. Provisional Application No. 62/093,756, filed Dec. 18, 2014, the disclosures of which are incorporated herein by reference in their entirety.

TECHNICAL FIELD

The disclosure relates to batteries and more particularly to metal/oxygen based batteries.

BACKGROUND

Rechargeable lithium-ion (Li-ion) batteries are attractive energy storage systems for portable electronics and electric and hybrid-electric vehicles because of their high specific energy compared to other electrochemical energy storage devices. As discussed more fully below, a typical Li-ion cell contains a negative electrode, a positive electrode, and a separator region between the negative and positive electrodes. Both electrodes contain active materials that insert or react with lithium reversibly. In some cases the negative electrode can include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, the electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal, 3863 mAh/g. The highest theoretical capacity achievable for a lithium-ion positive electrode is 1794 mAh/g (based on the mass of the lithiated material), for $Li_2O$. Other high-capacity materials include $BiF_3$ (303 mAh/g, lithiated), $FeF_3$ (712 mAh/g, lithiated), and others. Unfortunately, all of these materials react with lithium at a lower voltage compared to conventional oxide positive electrodes, hence limiting the theoretical specific energy. Nonetheless, the theoretical specific energies are still very high (>800 Wh/kg) compared to a maximum of ~500 Wh/kg for a cell with lithium negative and conventional oxide positive electrodes, which can enable an electric vehicle to approach a range of 300 miles or more on a single charge.

Figure 1:
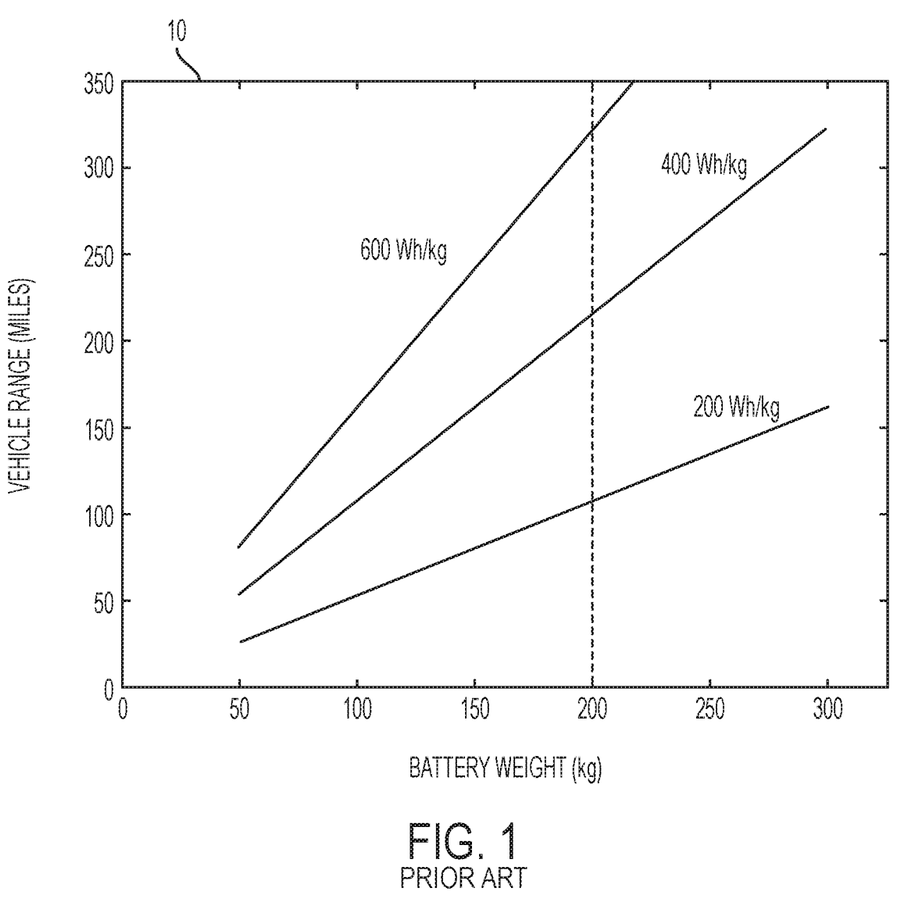
FIG. 1 depicts a plot showing the relationship between battery weight and vehicular range for various specific energies.

FIG. 1 depicts a chart 10 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Figure 2:
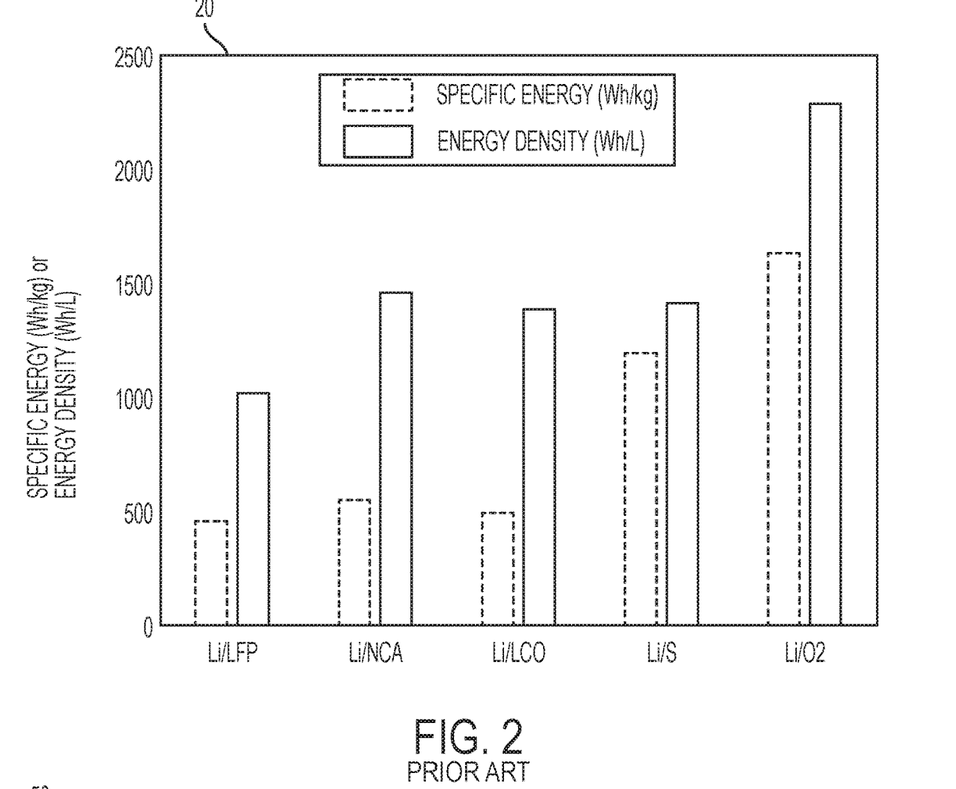
FIG. 2 depicts a chart of the specific energy and energy density of various lithium-based cells.

Various lithium-based chemistries have been investigated for use in various applications including in vehicles. FIG. 2 depicts a chart 20 which identifies the specific energy and energy density of various lithium-based chemistries. In the chart 20, only the weight of the active materials, current collectors, binders, separator, and other inert material of the battery cells are included. The packaging weight, such as tabs, the cell can, etc., are not included. As is evident from the chart 20, lithium/oxygen batteries, even allowing for packaging weight, are capable of providing a specific energy >600 Wh/kg and thus have the potential to enable driving ranges of electric vehicles of more than 300 miles without recharging, at a similar cost to typical Li-ion batteries. While lithium/oxygen cells have been demonstrated in controlled laboratory environments, a number of issues remain before full commercial introduction of a lithium/oxygen cell is viable as discussed further below.

Figure 3:
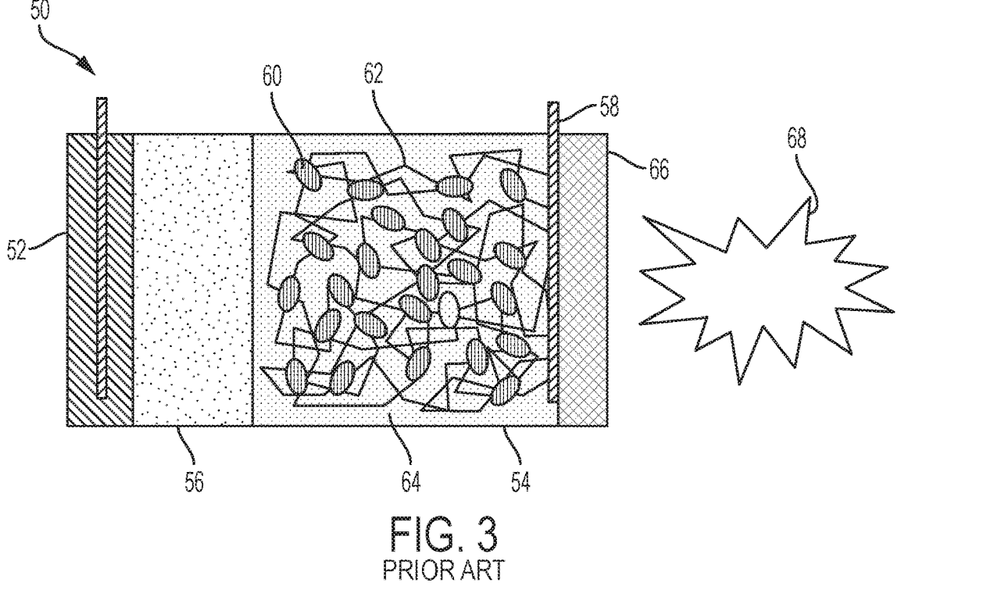
FIG. 3 depicts a prior art lithium/oxygen cell including two electrodes, a separator, and an electrolyte.

A typical lithium/oxygen electrochemical cell 50 is depicted in FIG. 3. The cell 50 includes a negative electrode 52, a positive electrode 54, a porous separator 56, and a current collector 58. The negative electrode 52 is typically metallic lithium. The positive electrode 54 includes electrode particles such as particles 60 possibly coated in a catalyst material (such as Au or Pt) and suspended in a porous, electrically conductive matrix 62. An electrolyte solution 64 containing a salt such as $LiPF_6$ dissolved in an organic solvent such as dimethoxyethane or $CH_3CN$ permeates both the porous separator 56 and the positive electrode 54. The $LiPF_6$ provides the electrolyte with an adequate conductivity which reduces the internal electrical resistance of the cell 50 to allow a high power.

A portion of the positive electrode 54 is enclosed by a barrier 66. The barrier 66 in FIG. 3 is configured to allow oxygen from an external source 68 to enter the positive electrode 54 while filtering undesired components such as contaminant gases and fluids. The wetting properties of the positive electrode 54 prevent the electrolyte 64 from leaking out of the positive electrode 54. Alternatively, the removal of contaminants from an external source of oxygen, and the retention of cell components such as volatile electrolyte, may be carried out separately from the individual cells. Oxygen from the external source 68 enters the positive electrode 54 through the barrier 66 while the cell 50 discharges and oxygen exits the positive electrode 54 through the barrier 66 as the cell 50 is charged. In operation, as the cell 50 discharges, oxygen and lithium ions are believed to combine to form a discharge product $Li_2O_2$ or $Li_2O$ in accordance with the following relationship:

The positive electrode 54 in a typical cell 50 is a lightweight, electrically conductive material which has a porosity of greater than 80% to allow the formation and deposition/ storage of $Li_2O_2$ in the cathode volume. The ability to deposit the $Li_2O_2$ directly determines the maximum capacity of the cell. In order to realize a battery system with a specific energy of 600 Wh/kg or greater, a plate with a thickness of 100 μm should have a capacity of about 15 mAh/cm$^2$ or more.

Materials which provide the needed porosity include carbon black, graphite, carbon fibers, carbon nanotubes, and other non-carbon materials. There is evidence that each of these carbon structures undergo an oxidation process during charging of the cell, due at least in part to the harsh environment in the cell (possibly pure oxygen, superoxide and peroxide ions and/or species, formation of solid lithium peroxide on the cathode surface, and electrochemical oxidation potentials of >3V (vs. Li/Li$^+$)).

A number of investigations into the problems associated with lithium/oxygen batteries have been conducted as reported, for example, by Beattie, S., D. Manolescu, and S. Blair, "High-Capacity Lithium-Air Cathodes," *Journal of the Electrochemical Society*, 2009. 156: p. A44; Kumar, B., et al., "A Solid-State, Rechargeable, Long Cycle Life Lithium-Air Battery, " *Journal of the Electrochemical Society*, 2010. 157: p. A50; Read, J., "Characterization of the lithium/oxygen organic electrolyte battery," *Journal of the Electrochemical Society*, 2002. 149: p. A1190; Read, J., et al., "Oxygen transport properties of organic electrolytes and performance of lithium/oxygen battery," *Journal of the Electrochemical Society*, 2003. 150: p. A1351; Yang, X. and Y. Xia, "The effect of oxygen pressures on the electrochemical profile of lithium/oxygen battery," *Journal of Solid State Electrochemistry*: p. 1-6; and Ogasawara, T., et al., "Rechargeable $Li_2O_2$ Electrode for Lithium Batteries," *Journal of the American Chemical Society*, 2006. 128(4): p. 1390-1393.

While some issues have been investigated, several challenges remain to be addressed for lithium/oxygen batteries. These challenges include limiting dendrite formation at the lithium metal surface, protecting the lithium metal (and possibly other materials) from moisture and other potentially harmful components of air (if the oxygen is obtained from the air), designing a system that achieves favorable specific energy and specific power levels, reducing the hysteresis between the charge and discharge voltages (which limits the round-trip energy efficiency), and improving the number of cycles over which the system can be cycled reversibly.

Some metal/air battery systems, including some lithium/oxygen battery systems, draw air from the surrounding atmosphere to supply oxygen to the battery cells. However, as noted above, one of the challenges of metal/air systems is reducing the influx of contaminants from the air that can lead to degradation of the battery. Some metal/air systems address contamination by supplying pure oxygen to the battery cells solely from an oxygen storage tank, but the addition of the tank adds mass and volume, making it impractical for electric vehicles. Other metal/air systems address contamination by purifying the air inlet with an oxygen separations unit to remove contaminants, such as moisture and carbon dioxide. Some known oxygen separations units are formed by a gas separation nanostructure, polymeric membranes, pressure-swing adsorption units, or temperature-swing adsorption units. These known separations units, however, can be costly, heavy, and large, making it difficult to integrate them into electric vehicles. Moreover, many known oxygen separations units cannot provide the required oxygen flow rates when higher discharge currents are required, such as during acceleration of an electric vehicle.

The following scenarios highlight by example the challenges that existing metal/air systems face in meeting the oxygen demands of a metal/air battery system for an electrical vehicle. The scenarios are based on the following assumptions: (1) The battery chemistry is $2 Li + O_2 \rightarrow Li_2O_2$ (on discharge); (2) The battery size is nominally 100 kWh (i.e., 100 kWh of energy can be discharged in a typical duty cycle); (3) The average battery discharge power over the duty cycle is 50 kW; and (4) The peak battery discharge power is 300 kW for up to 1 minute, which represents ~5% of the battery energy.

In Scenario 1, the lithium/oxygen battery system has an oxygen separations unit, but it does not include an oxygen storage tank. In this case, the separations unit must provide purified oxygen at a rate that supports the peak discharge power of 300 kW, or 750 L/min assuming a discharge voltage of 2.7 V. If an existing ceramic separations unit is used, such as the oxygen generator offered by Solid Cell, Inc. (http://solidcell.com/techOxygen.htm), the system would weigh ~500 kg and cost ~$9000, and the volume would be ~720 L. Even assuming that expected advances in the technology could decrease these figures by a factor of 5, the mass, volume, and cost would still be 100 kg, 144 L, and $1800, respectively.

In Scenario 2, the lithium/oxygen battery system has an oxygen storage tank, but it does not include an oxygen separations unit. In this case, for oxygen stored at 350 bar, the tank mass and volume would be 42 kg and 66 L, respectively. See P. Albertus, T. Lohmann, and J. Christensen, "Overview of Li/O2 Battery Systems, with a Focus on Oxygen handling Requirements and Technologies," *The Lithium Air Battery: Fundamentals*, 2014, p. 291-310). Thus, the scenarios illustrate that the weight, size, and/or cost of a lithium/oxygen system using only a gas separations unit (Scenario A) or only an oxygen storage tank (Scenario B) to supply oxygen to the battery cell can be impractical for use in electric vehicles.

What is needed, therefore, is a metal/air battery system capable of providing the requisite amount and purity of oxygen for the battery without exceeding the physical and cost limitations for use in an electric vehicle.

SUMMARY

A metal/air battery with an oxygen management system in one embodiment includes a negative electrode, a positive electrode, a separator positioned between the negative electrode and the positive electrode, an oxygen separations unit, an oxygenated gas supply reservoir, at least one valve fluidly coupled to the oxygen separations unit, the oxygenated gas supply reservoir, and the positive electrode and, during a discharge cycle, configured to selectively place the oxygen separations unit in fluid communication with the positive electrode, and selectively place the oxygenated gas supply reservoir in fluid communication with the positive electrode.

In some embodiments, the metal/air battery includes a compressor with an outlet fluidly coupled to the oxygenated gas supply reservoir, and a second valve fluidly coupled to the oxygen separations unit and to an inlet of the compressor and configured to selectively place the oxygen separations unit in fluid communication with the oxygenated gas supply reservoir via the compressor, a blower fluidly coupled to the oxygen separations unit and configured to increase a pressure of oxygen from the oxygen separations unit to the positive electrode, a third valve fluidly coupled to the oxygen separations unit and to an inlet of the blower and configured to selectively place the oxygen separations unit in fluid communication with the blower.

In some embodiments, the at least one valve includes a first valve that selectively places the oxygen separations unit in fluid communication with the positive electrode, and a second valve that selectively places the oxygenated gas supply reservoir in fluid communication with the positive electrode, the oxygen separations unit is in fluid communication with the positive electrode when the battery discharges at a first discharge power, the oxygenated gas supply reservoir in fluid communication with the positive electrode when the battery discharges at a second discharge power, and the second discharge power is greater than the first discharge power, the first discharge power corresponds to an average discharge power of the battery and the second discharge power corresponds to a peak discharge power of the battery, the oxygen separations unit is in fluid communication with the oxygenated gas supply reservoir during a charge cycle of the battery.

In some embodiments, the metal/air battery includes a gas outlet valve fluidly coupled to the positive electrode and configured to selectively place the positive electrode in fluid communication with the atmosphere, the positive electrode is in fluid communication with the atmosphere to vent one or more of unconsumed oxygen during the discharge cycle and accumulated oxygen during a charge cycle, a compressor with an outlet fluidly coupled to the oxygenated gas supply reservoir, a third valve fluidly coupled to the oxygen separations unit and to an inlet of the compressor and configured to selectively place the oxygen separations unit in fluid communication with the oxygenated gas supply reservoir via the compressor, a blower fluidly coupled to the oxygen separations unit and configured to increase a pressure of oxygen from the oxygen separations unit to the positive electrode, and a fourth valve fluidly coupled to the oxygen separations unit and to an inlet of the blower and configured to selectively place the oxygen separations unit in fluid communication with the blower, the first valve is fluidly coupled to an outlet of the blower and configured to place the blower in fluid communication with the positive electrode.

A battery management system in one embodiment includes a metal/air battery including a negative electrode, a positive electrode, and a separator positioned between the negative electrode and the positive electrode, an oxygen management system including an oxygen separations unit, an oxygenated gas supply reservoir, and a valve system fluidly coupled to the oxygen separations unit, the oxygenated gas supply reservoir, and the positive electrode, a memory in which command instructions are stored, and a processor operably connected to the valve system and, during a discharge cycle, configured to execute the command instructions to selectively place the oxygen separations unit in fluid communication with the positive electrode, and selectively place the oxygenated gas supply reservoir in fluid communication with the positive electrode.

In some embodiments, the oxygen management system further includes a compressor with an outlet fluidly coupled to the oxygenated gas supply reservoir, the valve system is fluidly coupled to an inlet of the compressor, and the processor is further configured to execute the command instructions to selectively place the oxygen separations unit in fluid communication with the oxygenated gas supply reservoir via the compressor, the oxygen management system further includes a blower fluidly coupled to the oxygen separations unit and configured to increase a pressure of oxygen from the oxygen separations unit to the positive electrode, the oxygen management system further includes a blower fluidly coupled to the oxygen separations unit, the valve system is fluidly coupled to an inlet of the blower, and the processor is further configured to execute the command instructions to selectively place the oxygen separations unit in fluid communication with the blower.

In some embodiments, the valve system includes a first valve fluidly coupled to the oxygen separations unit and the positive electrode, and a second valve fluidly coupled to oxygenated gas supply reservoir and the positive electrode, the processor further configured to execute the command instructions to selectively place the oxygen separations unit in fluid communication with the positive electrode via the first valve, and selectively place the oxygenated gas supply reservoir in fluid communication with the positive electrode via the second valve, the processor is further configured to execute the command instructions to place the oxygen separations unit in fluid communication with the positive electrode when the battery discharges at a first discharge power, and place the oxygenated gas supply reservoir in fluid communication with the positive electrode when the battery discharges at a second discharge power, the second discharge power greater than the first discharge power.

In some embodiments, the first discharge power corresponds to an average discharge power of the battery and the second discharge power corresponds to a peak discharge power of the battery, the processor is further configured to execute the command instructions to selectively place the oxygen separations unit in fluid communication with the oxygen gas supply reservoir during a charge cycle of the battery, the valve system includes a gas outlet valve fluidly coupled to the positive electrode, and the processor is further configured to execute the command instructions to selectively place the gas outlet valve in fluid communication with the atmosphere, the processor is further configured to execute the command instructions to regulate a flow rate of oxygen from one or more of the oxygen separations unit and the oxygenated gas supply reservoir with the valve system.

DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one of ordinary skill in the art to which this disclosure pertains.

Figure 4:
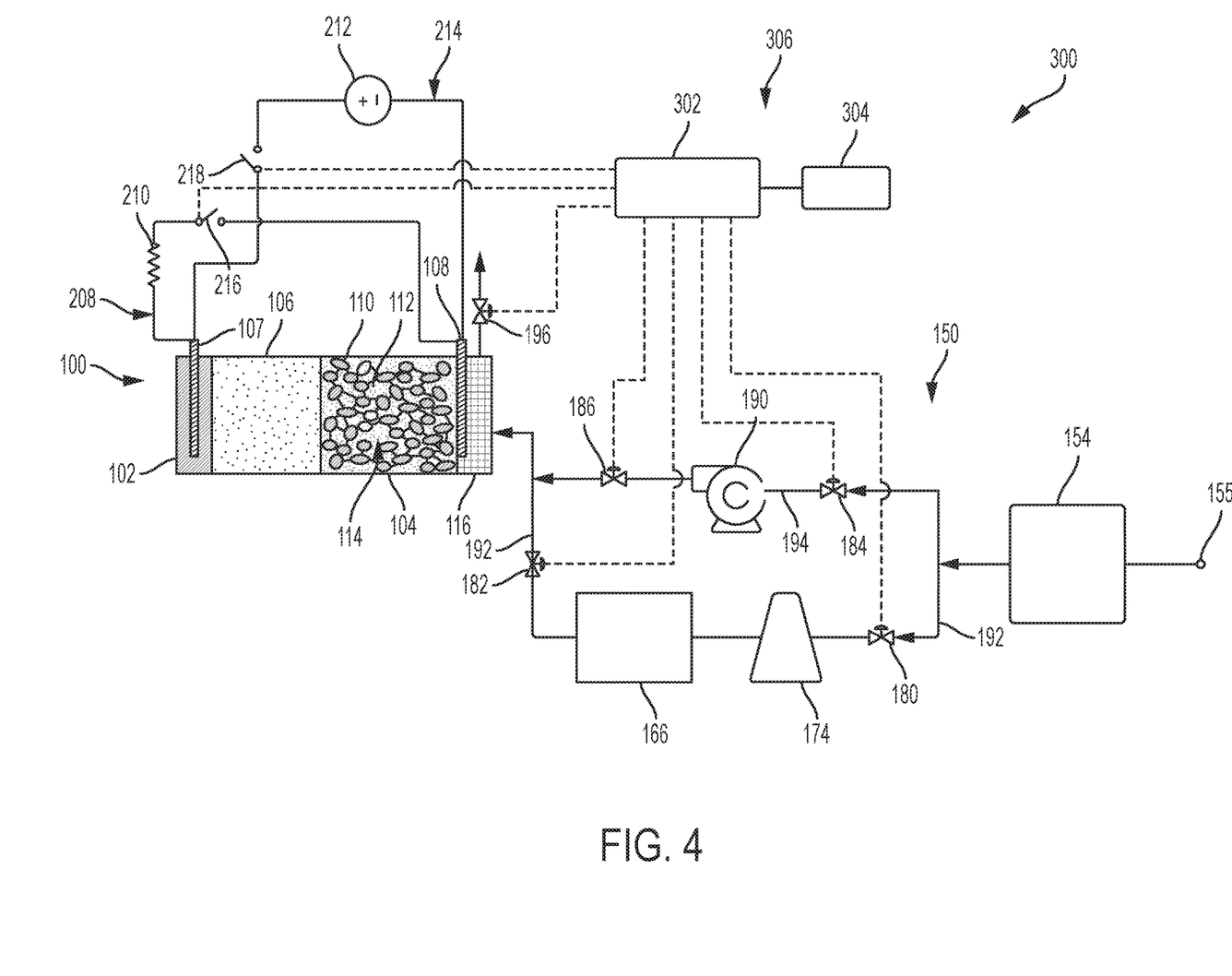
FIG. 4 depicts a schematic view of a vehicle battery system including a lithium/oxygen cell with two electrodes and an oxygen management system that is configured to supply oxygen to the cell during a discharge cycle.

A schematic of a vehicle battery system 300 including an electrochemical cell 100 and an oxygen management system 150 is shown in FIG. 4. The electrochemical cell 100 includes a negative electrode 102 separated from a positive electrode 104 by a porous separator 106. The negative electrode 102 may be formed from lithium metal or a lithium-insertion compound (e.g., graphite, silicon, tin, LiAl, LiMg, $Li_4Ti_5O_{12}$), although Li metal affords the highest specific energy on a cell level compared to other possible negative electrodes. Other metals may also be used to form the negative electrode, such as Zn, Mg, Na, Fe, Al, Ca, Si, and others. In the example of FIG. 4, a current collector 107 is electrically connected to the metal in the negative electrode 102.

The positive electrode 104 in this embodiment includes a current collector 108 and electrode particles 110 that are suspended in a porous matrix 112. The electrode particles 110 are optionally covered in a catalyst material. The electrode particles 110 may be in the form of a thin, stabilizing coating to limit reaction between any discharge products and the electrode particles 110. The porous matrix 112 is an electrically conductive matrix formed from a conductive material such as conductive carbon or a nickel foam, although various alternative matrix structures and materials may be used. The separator 106 prevents the negative electrode 102 from electrically connecting with the positive electrode 104.

The electrochemical cell 100 includes an electrolyte solution 114 present in the positive electrode 104 and in some embodiments in the separator 106. In the exemplary embodiment of FIG. 4, the electrolyte solution 114 includes a salt, $LiPF_6$ (lithium hexafluorophosphate), dissolved in an organic solvent mixture. The organic solvent mixture can be any desired solvent. In certain embodiments, the solvent can be dimethoxyethane (DME), acetonitrile (MeCN), ethylene carbonate, or diethyl carbonate. The cell 100 in some embodiments includes a barrier 116 that encloses a portion of the positive electrode 104. The barrier 116 allows oxygen to pass into the positive electrode 104 while at the same time preventing the electrolyte solution 114 from leaking out from the positive electrode 104.

The oxygen atoms and $Li^+$ ions within the positive electrode 104 form a discharge product inside the positive electrode 104, aided by the optional catalyst material on the electrode particles 110. As seen in the following equations, during the discharge process metallic lithium is ionized, combining with oxygen and free electrons to form $Li_2O_2$ or $Li_2O$ discharge product that may coat the surfaces of the carbon particles 110.

In the example of FIG. 4, the cell 100 is coupled to the oxygen management system 150. The oxygen management system 150 includes an oxygen separations unit 154, an oxygen supply reservoir 166, a compressor 174, and a valve system including a plurality of valves 180, 182, 184, and 186. The oxygen management system 150 can also include an optional blower 190 that is coupled between the separations unit 154 and the cell 100. The vehicle battery system 300 in the embodiment shown includes a processor 302 which is operatively connected to a memory 304. The processor 302 is operable to execute command instructions stored in the memory 304 to control various aspects of the vehicle battery system 300. As discussed in further detail below, the processor 302 can be operatively connected to various components of the vehicle battery system 300, such as one or more of the valves 180, 182, 184, and 186, to form a battery management system 306.

While the oxygen management system 150 is depicted as being coupled to the single cell 100 for illustrative purposes in FIG. 4, the oxygen management system 150 can be coupled to a plurality of cells in one or more battery packs to provide a centralized storage and control system for oxygen in a larger battery system. In an exemplary embodiment, the battery packs including the cell 100 and oxygen management system 150 are incorporated into a motor vehicle. In another non-limiting example, the cell 100 and oxygen management system 150 are electrically connected to an electrical power generator, such as a wind or solar power generator, to store energy for use when the electric power generator is not operating at full capacity.

In the configuration depicted in FIG. 4, the oxygen management system 150 handles a gas with a composition that is similar to standard air in the atmosphere, but that can be filtered to remove moisture ($H_2O$), carbon monoxide (CO), carbon dioxide ($CO_2$), nitrogen oxide ($NO_x$) compounds that are commonly associated with smog, and other contaminants that can negatively impact the operation of the cell 100. In particular, contaminants that react with catalyst materials in the positive electrode 104 to "poison" the catalyst can be filtered at one or more locations in the oxygen management system 150. Also, some of the common components of air such as $CO_2$ and $H_2O$ react with the discharge product $Li_2O_2$ to form LiOH and/or $Li_2CO_3$, which damages the cell. In another configuration, the oxygen management system 150 handles high concentrations of oxygen, which is to say that the system 150 handles pure oxygen or oxygen at a measurably higher concentration than is typically present in the atmosphere.

During a discharge cycle, the cell 100 admits oxygen to the positive electrode 104. The oxygen management system 150 is configurable in a variety of operating states to deliver oxygen to the cell 100 and enable the oxygen to flow through the barrier 116 and into the positive electrode 104. In particular, the oxygen management system 150 is configurable to: (a) supply oxygen to the cell 100 from the oxygen separations unit 154, (b) supply oxygen to the oxygen supply reservoir 166 from the oxygen separations unit 154, (c) supply oxygen to both the cell 100 and the oxygen supply reservoir 166 from the oxygen separations unit, (d) supply oxygen to the cell 100 from the oxygen supply reservoir 166, (e) supply oxygen to the cell 100 from both the oxygen separations unit 154 and the oxygen supply reservoir 166, and (f) supply oxygen to the cell 100 from both the oxygen supply reservoir 166 and the oxygen separations unit 154 and additionally supply oxygen to the oxygen supply reservoir 166 from the oxygen separations unit 154.

The oxygen separations unit 154 is sized to provide oxygen continuously during the duty cycle at a rate sufficient to maintain the average discharge power of the cell (e.g., 50 kW over a three to four hour discharge for an electric vehicle). The oxygen separations unit 154 depicted in FIG. 4 draws in standard air in the atmosphere through an inlet (depicted schematically at 155). In one embodiment, the air is passed over an oxygen conductive layer (not shown) that allows oxygen to pass through the conductive layer while other components of the air remain outside the oxygen conductive layer. The oxygen conducting layer in this embodiment includes a relatively thick membrane (>>50 nm) consisting of an oxygen conducting material. In order to allow sufficient gas transport through the membrane, a heating grid is embedded in the membrane volume of some embodiments. An example of an oxygen conducting layer that can be implemented in the oxygen separations unit 154 is described in more detail in U.S. Patent Application Publication No. 2014-0234731 A1, the disclosure of which is incorporated herein by reference in its entirety.

The oxygen supply reservoir 166 is sized to provide oxygen to the cell at higher flow rates when the cell 100 is subject to a higher discharge power (e.g., 300 kW for up to one minute for acceleration of an electric vehicle). In an illustrative example using the assumptions discussed with reference to Scenario 1 and Scenario 2 above, the oxygen supply reservoir 166 is configured to store approximately 5% of the required the oxygen and the oxygen separations unit 154 is configured to provide purified oxygen continuously during the duty cycle at a rate sufficient for 50 kW average power. Assuming linear scaling, the total mass of the oxygen supply reservoir 166 and oxygen separations unit 154 would be (2+17)=19 kg, and the total volume would be (3+24)=27 L, which are significantly less than the respective masses and volumes of either Scenario 1 or Scenario 2. Assuming advances in technology, the cost of the oxygen separations unit 154 would drop to $300, which is in an acceptable range for a 100-kWh system (~3% of the system cost assuming $100/kWh).

It should be understood that the oxygen separations unit 154 and the oxygen supply reservoir 166 in other embodiments can be sized to accommodate different peak/average power ratios and peak-power discharge times. For instance, it may be desirable to provide enough oxygen in the oxygen supply reservoir 166 to provide for two minutes of discharge at 300 kW.

In this case, the total mass and volumes of the oxygen supply reservoir 166 and the oxygen separations unit 154 would be 21 kg and 30 L, respectively. While the oxygen management system 150 of FIG. 4 is described with reference to a vehicle battery system, it should be understood that the environment of the oxygen management system is not in any way meant to limit application of the principles of the oxygen management system to other environments. For example, as noted above, the oxygen management system could be operatively connected to an electrical power generator. As such, the oxygen management system 150 can be scaled up or down to accommodate larger or smaller peak/average power ratios and peak-power discharge times as may be expected in an electrical power generator.

In the embodiment shown in FIG. 4, the oxygen separations unit 154 is pneumatically connected to the cell 100 via conduit 192 and conduit 194. The conduit 192 forms a continuous line for flow of oxygen from the oxygen separations unit 154 to the cell 100. The oxygen supply reservoir 166 and the compressor 174 are disposed along the conduit 192 with the compressor 174 positioned upstream from the oxygen supply reservoir 166. A flow control valve 180 positioned upstream from the compressor 174 is configured to stop the flow of oxygen to the compressor 174 from the oxygen separations unit 154. A flow control valve 182 positioned downstream from the oxygen supply reservoir 166 is configured to stop the flow of oxygen to the cell 100 from the oxygen supply reservoir 166 or, in the case of charging of the cell 100, from the cell 100 to the oxygen supply reservoir 166.

The conduit 194 branches off from conduit 192 downstream from the oxygen separations unit 154 and upstream from the flow control valve 180 and then rejoins the conduit 192 downstream from the flow control valve 182 and before the conduit 192 is coupled to the cell 100. The optional blower 190 is disposed along the conduit 194. The blower 190 is used to increase the pressure of the oxygen coming out of the oxygen separations unit 154 such that it flows easily through the cell 100. In one embodiment, the blower increases the pressure of the oxygen coming from the oxygen separations unit to 2 bar. A flow control valve 184 is positioned upstream from the blower 190 and a flow control valve 186 is positioned downstream from the blower 190. The flow control valves 184 and 186 are configured to stop the flow of oxygen through the conduit 194 and the blower 190.

In the operating state in which the oxygen management system 150 supplies oxygen to the cell 100 from only the oxygen separations unit 154, the battery management system 306 closes the valves 180 and 182 and opens the valves 184 and 186. This valve configuration enables oxygen to flow from the oxygen separations unit 154 through the conduit 194 and through the end of the conduit 192 and into the cell 100. There is no oxygen flow to the compressor 174 or from the oxygen supply reservoir 166 when the valves 180 and 182 are closed. As noted above, the oxygen management system 150 can operate the blower 190 to increase the pressure of the oxygen supplied to the cell 100, if needed.

In the operating state in which the oxygen management system 150 supplies oxygen to the oxygen supply reservoir 166 from the oxygen separations unit 154, and no oxygen is supplied to the cell 100, the battery management system 306 closes the valves 182, 184, and 186 and opens the valve 180. This valve configuration enables oxygen to flow from the oxygen separations unit 154 to the compressor 174 and to the oxygen supply reservoir 166. There is no oxygen flow through the conduit 194 to the cell 100 or from the oxygen supply reservoir 166 to the cell 100 when the valves 182, 184, and 186 are closed. The compressor 174 in this embodiment receives oxygen from the oxygen separations unit 154 and compresses the oxygen for storage in the oxygen supply reservoir 166.

In the operating state in which the oxygen management system 150 supplies oxygen to both the cell 100 and the oxygen supply reservoir 166 from the oxygen separations unit 154, the battery management system 306 closes the valve 182 and opens the valves 180, 184, and 186. This valve configuration enables oxygen to flow from the oxygen separations unit 154 through the conduit 194 and through the end of the conduit 192 and into the cell 100 and further enables oxygen to flow from the oxygen separations unit 154 to the compressor 174 and to the oxygen supply reservoir 166. There is no oxygen flow from the oxygen supply reservoir 166 to the cell 100 when the valve 182 is closed.

In the operating state in which the oxygen management system 150 supplies oxygen to the cell 100 from only the oxygen supply reservoir 166, the battery management system 306 closes the valves 180, 184, and 186 and opens the valve 182. This valve configuration enables oxygen to flow from the oxygen supply reservoir 166 through the remaining portion of the conduit 192 and into the cell 100. There is no oxygen flow through the conduit 194 to the cell 100 or from the oxygen separations unit 154 to the compressor 174 when the valves 180, 184, and 186 are closed. In this configuration, the flow of oxygen from the oxygen supply reservoir 166 to the cell 100 presumes that the oxygen supply reservoir 166 is charged with sufficient pressure for the rate and duration of oxygen flow needed for the given discharge power of the cell 100.

In the operating state in which the oxygen management system 150 supplies oxygen to the cell 100 from both the oxygen separations unit 154 and the oxygen supply reservoir 166, the battery management system 306 closes the valve 180 and opens the valves 182, 184, and 186. This valve configuration enables oxygen to flow from the oxygen supply reservoir 166 through the remaining portion of the conduit 192 and into the cell 100 and also enables oxygen to flow from the oxygen separations unit 154 through the conduit 194 and through the end of the conduit 192 and into the cell 100. There is no oxygen flow from the oxygen separations unit 154 to the compressor 174 when the valve 180 is closed.

In the operating state in which the oxygen management system 150 supplies oxygen to the cell 100 from both the oxygen separations unit 154 and the oxygen supply reservoir 166, and simultaneously supplies oxygen to the oxygen supply reservoir 166 from the oxygen separations unit 166, the battery management system 306 opens the valves 180, 182, 184, and 186. This valve configuration enables oxygen to flow from the oxygen separations unit 154 through the conduit 194 and through the end of the conduit 192 and into the cell 100. This valve configuration also enables oxygen to flow from the oxygen supply reservoir 166 through the remaining portion of the conduit 192 and into the cell 100 and enables oxygen to flow from the oxygen separations unit 154 to the compressor 174 and to the oxygen supply reservoir 166. In some embodiments, the flow control valves 182 and 186 are embodied as a single valve positioned downstream from the oxygen supply reservoir 166 and the blower 190. For instance, in some embodiments, the flow control valves 182 and 186 are embodied as a single, 4-position shuttle valve that enables the valve to selectively place one or both of the oxygen supply reservoir 166 and the oxygen separations unit 154 in fluid communication with the positive electrode 116 in some positions. In other positions of the 4-position shuttle valve, the oxygen supply reservoir 166 and the oxygen separations unit 154 are not in fluid communication with the positive electrode 116.

In one embodiment of the oxygen management system 150, the oxygen supply reservoir 166 can store the oxygen at a higher pressure than an operating pressure of oxygen in the cell 100. For example, the oxygen supply reservoir 166 can store the oxygen in a range of 20 to 500 bar, while the cell 100 is configured to accept the gas at a pressure of 1 to 10 bar. The increased pressure of the oxygen can promote efficient operation of the cell 100 up to a certain pressure level. For example, operating the electrochemical cell 100 at a pressure of greater than one bar (atmospheric pressure at sea level) can help prevent delamination of the Li metal electrode from its protection layers. The elevated pressure can also reduce mass-transport limitations in the positive electrode and thereby increase the limiting current by increasing the chemical potential of oxygen. At higher pressures of oxygen, the amount of oxygen dissolved in the electrolyte and the driving force for oxygen transport to the reaction site is increased. If the pressure is increased to excessive levels, however, then the oxygenated gas can damage the cell 100. Consequently, a pressure regulating device (not shown) in one embodiment can be provided in the conduit 192 before the oxygen is supplied to the cell 100.

In the embodiment depicted in FIG. 4, the vehicle battery system 300 includes a gas outlet valve 196 coupled to the cell 100. The battery management system 306 can open the gas outlet valve 196 during discharge to exhaust any unconsumed oxygen form the cell 100. Also during discharge, the battery management system 306 can close the gas outlet valve 196 with the oxygen flow rate controlled such that such that the cell 100 consumes all of the available oxygen or the oxygen is "dead-ended".

In addition to controlling the on-off state of the valves 180, 182, 184, and 186 as described above, the battery management system 306 in some embodiments can operate the valves 180, 182, 184, and 186 to control the oxygen flow rate to the cell 100. In these embodiments, the battery management system 306 is configured with one or more flow sensors (not shown) and can adjust the valves 180, 182, and 186 while oxygen is flowing through the conduits 192 and 194 based on the flow rate measured by the flow sensors.

During discharge, the cell 100 is connected to an electrical load via a first electrical circuit 208. The electrical load can include a vehicle drivetrain, a variety of vehicle electronics, the oxygen separations unit 154, the compressor 174, and the blower 190. For simplicity all such loads are represented by a single resistor 210 in FIG. 4.

To charge the cell 100, a power supply 212 provides power to the cell 100 via a second electrical circuit 214. During a charge cycle, the positive electrode 104 generates a volume of gas, including oxygen, with the oxygen originating from the reaction products formed during the discharging process. For example, it is believed that reaction products that include oxygen such as $Li_2O_2$ and $Li_2O$ can be formed in the electrode 104 during discharge of the cell 100.

During the charging process, electrical current flows through the positive electrode 104 and the reaction products disassociate, with the oxygen returning to a gas phase. The gaseous oxygen builds within the positive electrode 104 and generates a positive pressure. The battery management system 306 closes the valves 182 and 186, which are shown as the valves closest to the inlet of the cell 100, and opens the gas outlet valve 196 to prevent gases from accumulating in cell 100 to an unsafe level. In some embodiments, the battery management system 306 can open the valve 180 to enable the oxygen separations unit 154 and the compressor 174 to fill the oxygen supply reservoir 166 while simultaneously charging the cell 100. In this case, the power supply 212 provides power to the oxygen separations unit 154 and the compressor 174, as well as the cell 100.

FIG. 4 illustrates the first electrical circuit 208 and the second electrical circuit 214 with respective switches 216 and 218 in their open states. No charging or discharging of the cell 100 occurs when the circuits 208 and 214 are in the open state. For discharging of the cell 100, the battery management system 306 places the switch 216 in the closed state and places the switch 218 in the open state. For charging of the cell 100, the battery management system 306 places the switch 216 in the open state and places the switch 218 in the closed state. While the vehicle battery system 300 has been described as including a battery management system 306 to control the various components of the system, other embodiments of the vehicle battery system can implement other forms of open loop or closed loop control with or without use a battery management system.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A metal/air battery with an oxygen management system, comprising:
a negative electrode;
a positive electrode;
a separator positioned between the negative electrode and the positive electrode;
an oxygen separations unit;
an oxygenated gas supply reservoir;
at least one valve fluidly coupled to the oxygen separations unit, the oxygenated gas supply reservoir, and the positive electrode and, during a discharge cycle, configured to:
selectively place the oxygen separations unit in fluid communication with the positive electrode, and
selectively place the oxygenated gas supply reservoir in fluid communication with the positive electrode;
wherein:
the oxygen separations unit is in fluid communication with the positive electrode when the battery discharges at a first discharge power,
the oxygenated gas supply reservoir is not in fluid communication with the positive electrode when the battery discharges at the first discharge power,
the oxygenated gas supply reservoir is in fluid communication with the positive electrode when the battery discharges at a second discharge power,
the second discharge power is greater than the first discharge power; and
the first discharge power corresponds to an average discharge power of the battery and the second discharge power corresponds to a peak discharge power of the battery.

2. The metal/air battery of claim 1, further comprising:
a compressor with an outlet fluidly coupled to the oxygenated gas supply reservoir; and
a second valve fluidly coupled to the oxygen separations unit and to an inlet of the compressor and configured to selectively place the oxygen separations unit in fluid communication with the oxygenated gas supply reservoir via the compressor.

3. The metal/air battery of claim 2, further comprising:
a blower fluidly coupled to the oxygen separations unit and configured to increase a pressure of oxygen from the oxygen separations unit to the positive electrode; and
a third valve fluidly coupled to the oxygen separations unit and to an inlet of the blower and configured to selectively place the oxygen separations unit in fluid communication with the blower.

4. The metal/air battery of claim 2, wherein the oxygen separations unit is in fluid communication with the oxygenated gas supply reservoir during a charge cycle of the battery.

5. The metal/air battery of claim 1, further comprising:
a blower fluidly coupled to the oxygen separations unit and configured to increase a pressure of oxygen from the oxygen separations unit to the positive electrode.

6. The metal/air battery of claim 1, wherein the at least one valve includes:
a first valve that selectively places the oxygen separations unit in fluid communication with the positive electrode, and
a second valve that selectively places the oxygenated gas supply reservoir in fluid communication with the positive electrode.

7. The metal/air battery of claim 6, further comprising:
a compressor with an outlet fluidly coupled to the oxygenated gas supply reservoir;
a third valve fluidly coupled to the oxygen separations unit and to an inlet of the compressor and configured to selectively place the oxygen separations unit in fluid communication with the oxygenated gas supply reservoir via the compressor;
a blower fluidly coupled to the oxygen separations unit and configured to increase a pressure of oxygen from the oxygen separations unit to the positive electrode; and
a fourth valve fluidly coupled to the oxygen separations unit and to an inlet of the blower and configured to selectively place the oxygen separations unit in fluid communication with the blower,
wherein the first valve is fluidly coupled to an outlet of the blower and configured to place the blower in fluid communication with the positive electrode.

8. The metal/air battery of claim 1, further comprising:
a gas outlet valve fluidly coupled to the positive electrode and configured to selectively place the positive electrode in fluid communication with the atmosphere,
wherein the positive electrode is in fluid communication with the atmosphere to vent one or more of unconsumed oxygen during the discharge cycle and accumulated oxygen during a charge cycle.

9. A battery management system, comprising:
a metal/air battery including a negative electrode, a positive electrode, and a separator positioned between the negative electrode and the positive electrode;
an oxygen management system including an oxygen separations unit, an oxygenated gas supply reservoir, and a valve system fluidly coupled to the oxygen separations unit, the oxygenated gas supply reservoir, and the positive electrode;
a memory in which command instructions are stored; and
a processor operably connected to the valve system and, during a discharge cycle, configured to execute the command instructions to selectively place the oxygen management system in a plurality of operating states, the plurality of operating states including:
a first operating state in which oxygen is concurrently suppled from the oxygen separations unit to both the positive electrode and the oxygenated gas supply reservoir;
a second operating state in which oxygen is supplied from only the oxygen separations unit to the positive electrode; and
a third operating state in which oxygen is suppled only from the oxygenated gas supply reservoir to the positive electrode.

10. The battery management system of claim 9, wherein:
the oxygen management system further includes a compressor with an outlet fluidly coupled to the oxygenated gas supply reservoir,
the valve system is fluidly coupled to an inlet of the compressor, such that the oxygen separations unit is configured to supply oxygen to the oxygenated gas supply reservoir via the compressor.

11. The battery management system of claim 10, wherein:
the oxygen management system further includes a blower fluidly coupled to the oxygen separations unit,
the valve system is fluidly coupled to an inlet of the blower, and
the processor is further configured to execute the command instructions to selectively place the oxygen separations unit in fluid communication with the blower.

12. The battery management system of claim 10, wherein the processor is further configured to execute the command instructions to selectively place the oxygen separations unit in fluid communication with the oxygen gas supply reservoir during a charge cycle of the battery.

13. The battery management system of claim 9, wherein the oxygen management system further includes a blower fluidly coupled to the oxygen separations unit and configured to increase a pressure of oxygen supplied from the oxygen separations unit to the positive electrode.

14. The battery management system of claim 9, wherein the valve system includes:
   a first valve fluidly coupled to the oxygen separations unit and the positive electrode, and
   a second valve fluidly coupled to oxygenated gas supply reservoir and the positive electrode, the processor further configured to execute the command instructions to:
      selectively place the oxygen separations unit in fluid communication with the positive electrode via the first valve, and
      selectively place the oxygenated gas supply reservoir in fluid communication with the positive electrode via the second valve.

15. The battery management system of claim 9, wherein the processor is further configured to execute the command instructions to:
   place the oxygen separations unit in fluid communication with the positive electrode when the battery discharges at a first discharge power, and
   place the oxygenated gas supply reservoir in fluid communication with the positive electrode when the battery discharges at a second discharge power, the second discharge power greater than the first discharge power.

16. The battery management system of claim 15, wherein the first discharge power corresponds to an average discharge power of the battery and the second discharge power corresponds to a peak discharge power of the battery.

17. The battery management system of claim 9, wherein:
   the valve system includes a gas outlet valve fluidly coupled to the positive electrode, and
   the processor is further configured to execute the command instructions to, during the discharge cycle, selectively place the gas outlet valve in fluid communication with the atmosphere.

18. The battery management system of claim 9, wherein the processor is further configured to execute the command instructions to regulate a flow rate of oxygen from one or more of the oxygen separations unit and the oxygenated gas supply reservoir with the valve system.

19. The battery management system of claim 9, wherein the plurality of operating states for the oxygen management system further includes a fourth operating state in which oxygen is concurrently supplied to the positive electrode from both the oxygen separations unit and the oxygenated gas supply reservoir.

20. The battery management system of claim 9, wherein the oxygenated gas supply reservoir is configured to store a quantity of oxygen corresponding to approximately 5% of the total discharge of the battery.

* * * * *

UNITED STATES PATENT AND TRADEMARK OFFICE
CERTIFICATE OF CORRECTION

PATENT NO. : 10,741,894 B2
APPLICATION NO. : 15/536102
DATED : August 11, 2020
INVENTOR(S) : Christensen et al.

Page 1 of 1

It is certified that error appears in the above-identified patent and that said Letters Patent is hereby corrected as shown below:

In the Claims

In Claim 9, at Column 14, Line 43: "suppled" should read --supplied--.

In Claim 9, at Column 14, Line 49: "suppled" should read --supplied--.

Signed and Sealed this
Fifth Day of January, 2021

Andrei Iancu
*Director of the United States Patent and Trademark Office*